Patented Nov. 11, 1952

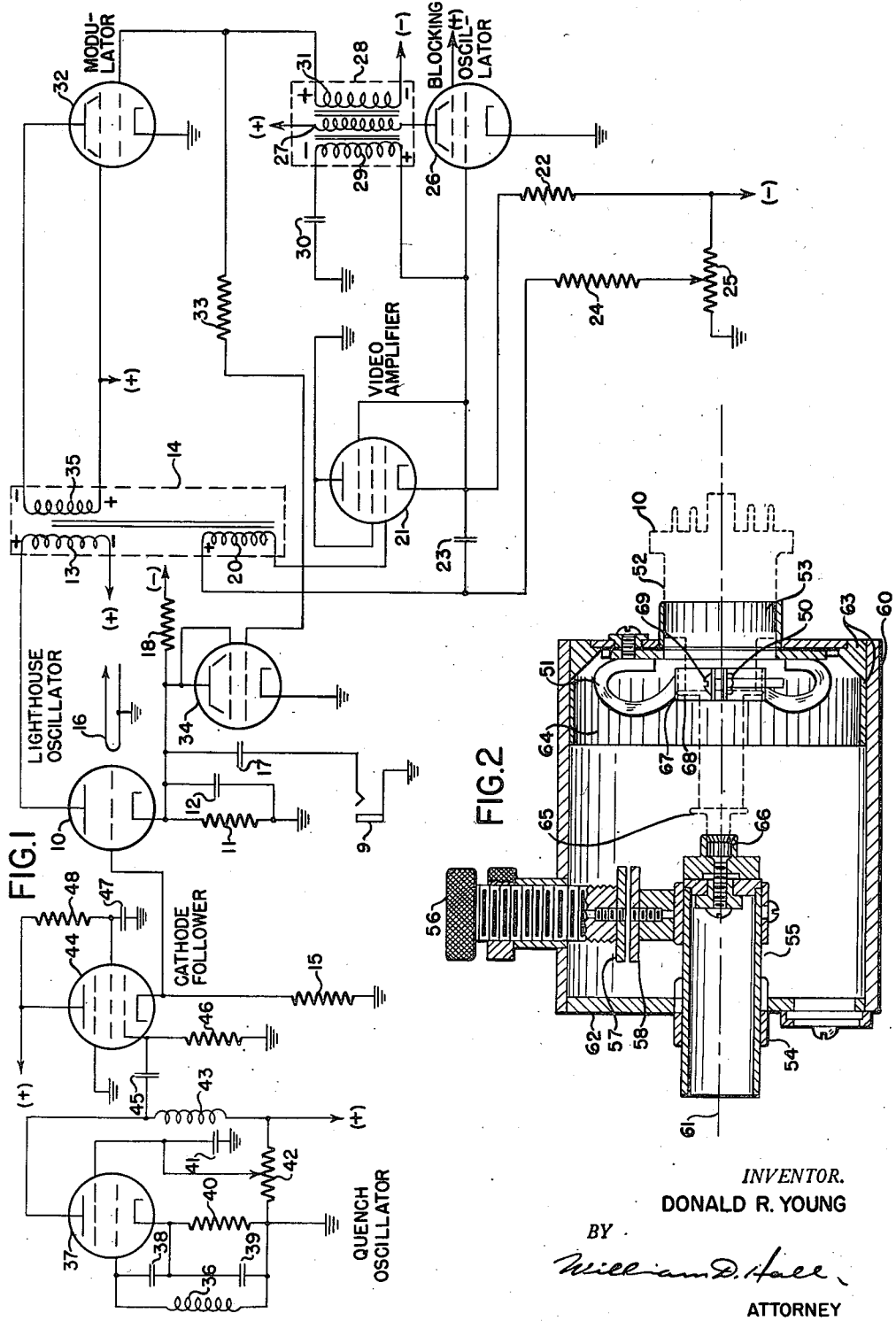

2,617,925

UNITED STATES PATENT OFFICE 2,617,925

RECEIVER TRANSMITTER

Donald R. Young, Cambridge, Mass., assignor, by mesne assignments, to the United States of America as represented by the Secretary of War Application October 19, 1945, Serial No. 623,398

10 Claims. (Cl. 250—15)

This invention relates in general to electrical transmitting and receiving circuits, and more particularly to such circuits which transmit a pulse of electromagnetic energy at a time dependent upon the time of reception of a similar pulse wave.

For some purposes in radio pulse communication, it is desirable to provide a combination receiver-transmitter, the pulse output of the transmitter being synchronized by the pulse input to the receiver. Such a device is often referred to as a transponder.

One of the undesirable features present in transponders in general is the presence of dead time, which is the time it takes the transponder to recover and be ready to receive after the unit has finished transmitting. Dead time is especially long in a transponder which uses the same tube for receiving and transmitting, as is often the case. It is seen that the maximum dead time which can be allowed is substantially equal to the minimum period between received pulses. In one type of transponder there is present a dead time of substantially 1000 microseconds after each transmitted pulse. This is entirely too long for a number of applications.

Among the objects of the present invention, therefore, are:

1. To provide a transponder for use at extremely high frequencies;

2. To provide such a transponder which uses the same tube for receiving and for transmitting; and 3. To provide such a transponder having a very short dead time.

In accordance with the present invention there is provided a transponder using a lighthouse (disc-seal) tube arranged in a cavity resonator as a combination superregenerative detecting tube and transmitting oscillator tube. A separate quench oscillator has its output fed to the grid of the lighthouse tube through a cathode follower.

The received pulse energy is transformer-coupled from the lighthouse tube through a bootstrap video amplifier to a normally-off blocking oscillator. The pulse output from the blocking oscillator is fed to the modulator tube from whence it is transformer-coupled to the plate of the oscillator.

This invention will best be understood by reference to the drawings, in which:

Fig. 1 is a complete circuit diagram of the superregenerative receiver and transmitter; and Fig. 2 is a drawing of the cavity resonator used in association with the lighthouse oscillator tube.

Referring now to a description of the circuit and to Fig. 1, it is seen that the lighthouse tube cavity oscillator is merely shown functionally. The lighthouse, or disc-seal, tube is shown in the symbol of an ordinary triode 10. One such tube is the type 446. The self-bias circuit of the oscillator consists of resistor 11 and condenser 12 connected in parallel from the cathode of tube 10 to ground. The plate of tube 10 is tied directly to one winding 13 of pulse transformer 14. The other end of winding 13 goes to the positive side of the B+ supply, as noted. Polarity marks are placed in their proper positions on the windings of transformer 14. The grid leak resistor 15 for tube 10 is shown tied between the grid and ground. The radio frequency coupling loop 16, shown schematically, may consist of the center conductor of a coaxial line formed into a loop and judiciously placed with respect to the magnetic field inside the cavity resonator, in which the tube is positioned. For monitoring purposes a jack 9 is used, which is connected through condenser 17 to the cathode of tube 10, and to ground. This cathode is returned through a large resistance 18 to a large negative voltage, as noted. A tube 34 with high amplification, shown for an example as a beam power tube, is connected from the cathode to ground.

When the lighthouse oscillator acts as a superregenerative detector, the output is coupled through winding 20 of transformer 14 to the first grid of video amplifier tube 21, the accompanying circuit being referred to as a bootstrap circuit. The cathode of tube 21 is returned through a load resistor 22 to a negative voltage, as noted. The screen grid of tube 21 is connected directly to the plate, the suppressor grid of this tube is tied directly to the cathode, and the plate of the tube is grounded. One end of winding 20 of transformer 14 is connected to the grid of tube 21, and the other end is coupled through condenser 23 to the cathode, and through resistor 24 to the tap on potentiometer 25. This potentiometer is connected between ground and a negative voltage, as noted.

The cathode output of tube 21 is coupled directly to the grid of a normally non-conducting blocking oscillator tube 26, shown as a beam power tube for an example. The cathode of tube 26 is grounded, and the screen grid is connected to a positive voltage, as shown. The plate of tube 26 is connected to one end of what might be called the primary winding 27 of pulse transformer 28, the other end of the winding 27 being connected to a positive voltage, as noted. The so-called secondary winding 29 has one end connected to the grid of the tube 26 and the other end tied through condenser 30 to ground. The polarity markings are shown in their respective positions.

The output of the blocking oscillator is taken from the so-called tertiary winding 31 of the pulse transformer 28. One end of winding 31 is tied directly to a negative voltage, while the other end is tied to the grid of modulator tube 32 and also through resistor 33 to the grid of tube 34. The cathode of tube 34 is grounded and the screen grid is tied directly to the plate, which is connected to the cathode of the lighthouse tube 10. The cathode of tube 32 is grounded and the screen grid is tied to a point of positive potential. This tube is shown as a beam power tube as an example. The output of tube 32 is coupled to the lighthouse oscillator circuit through winding 35 of transformer 14. One end of this winding is connected to the plate of tube 32, and the other end is tied to a point of positive potential.

The quench oscillator for use with the lighthouse tube 10 when it is used as a superregenerative detector is of the standard Colpitts type. The inductance 36 of the resonant circuit is connected between the grid of the oscillator tube 37 and ground. The capacitance used in the resonant circuit is provided by condensers 38 and 39 in series. The point of split of the resonant capacitance is connected to the cathode of the tube, with resistor 40 in parallel with capacitor 39 for cathode bias purposes. The screen grid of tube 37 is grounded for high frequencies through condenser 41, and is connected for D.-C. to the tap on potentiometer 42, which is tied between a positive voltage and ground.

The output of the oscillator is impedance coupled, using coil 43, to the grid of cathode follower tube 44 through condenser 45. Grid leak resistor 46 is tied between the grid of tube 44 and ground. The load resistor 15 connected to the cathode of tube 44 also acts as a grid leak resistor for the lighthouse tube 10. The screen grid of tube 44 is grounded for high frequencies through condenser 47, and tied to the plate through screen dropping resistor 48, and thence to a positive voltage. The suppressor grid of tube 44 is normally grounded.

Fig. 2 is a side view of the cavity which forms the tank circuit for the lighthouse tube 10, with this tube being shown in dashed lines in its position in the cavity. The wall 60 of the cavity is rotationally symmetrical about axis 61. The end plate 62 and plunger 43 complete the structure which encloses the cavity volume. Plunger 63 makes contact with the wall 60 of the cavity by means of spring fingers 64, which are made to grip the wall very tightly. The plunger is movable in a direction parallel to axis 61.

The lighthouse tube 10 is positioned in the cavity essentially in the position shown by the dashed lines. The plate cap 65 of the tube fits snugly into socket 66. Ring section 67 clamps the grid connection 68 of the lighthouse tube thereto, this clamping being tightened by means of screw 69 and nut 50. The grid straps 51 are used for coupling from the grid to the cathode, and are designed so as to minimize changes in operation over the band. The cathode shell 52 of the tube is supported by means of spring fingers 53, which are made to be in good electrical contact with plunger 63. Spring fingers 54 are used to provide good electrical contact between the end 62 of the cavity and the post 55, to which the plate of the oscillator tube is connected.

The effective capacitance between the plate of the oscillator tube and the wall of the cavity may be varied by the tuning of knurled nut 56, which varies the spacing between condenser plates 57 and 58. Fine tuning is thereby accomplished. Coarse tuning may be provided by inserting a tuning screw into the cavity, and varying the depth of penetration into the cavity. This screw, not shown on the drawing, may be positioned perpendicular to axis 61, and with a motion along a diameter of the circular cross section of the cavity.

Power may be extracted from the cavity by means of a suitably placed coupling loop.

Referring now to the operation of the circuit and to Fig. 1, it is seen that the superregenerative receiver incorporated as a part of the circuit operates by the tube 10 being brought up to the threshold of oscillation periodically by the quench oscillator output which is fed through a cathode follower to the grid of tube 10. When a radio frequency pulse wave strikes the antenna, which is coupled to the cavity resonator of the lighthouse tube oscillator, at a time when the grid is in the neighborhood of the threshold of oscillation, this tube will produce a pulse output which will appear across winding 13 of pulse transformer 14. This pulse signal in turn appears across winding 20 of transformer 14, and is so coupled between grid and cathode of the video amplifier tube 21. When the pulse appears across the load resistor 22 of the video amplifier, a portion of this output is fed back to the grid in a regenerative manner, thus giving the "bootstrap" effect.

Blocking oscillator tube 26 is normally off due to the negative potential to which its grid is connected. When the positive pulse appears across load resistor 22, tube 26 is switched on, and a high power pulse is formed in the so-called tertiary winding 31 of transformer 28. This pulse is coupled to two points in the circuit, one being the modulator, from where it is fed to the plate load circuit of the lighthouse oscillator, thus allowing the tube to oscillate continuously. To further increase the power of the oscillations, the positive pulse from transformer 28 is fed to the grid of tube 34, thus placing a lower effective resistance in the cathode circuit of tube 10, and thus lowering the grid-cathode bias.

The superregenerative receiver would normally have a large "dead time" after a pulse has been transmitted due largely to the time it takes for the negative potentials that have accumulated on condensers between grids and cathodes of the various tubes to leak off. This is reduced in the present circuit by several means.

A blocking oscillator circuit would normally take a long time to recover after producing a pulse if a large resistor is used as the grid leak as is the usual case. This difficulty is alleviated in this circuit by feeding the synchronizing pulse to the blocking oscillator through a cathode follower, thus insuring that the grid discharge path for the blocking oscillator is one of low resistance.

It is believed that the introduction of the quench voltage to the lighthouse tube through a cathode follower contributes greatly to the reduction of the time constant in the grid circuit of this tube.

The current through the lighthouse tube while transmitting charges up the cathode bypass condenser 12 to such a value that the tube is insensitive to received pulses while this voltage is present. Thus the dead time of the lighthouse oscillator tube depends upon the time of discharge of this voltage. This discharge is greatly facilitated by tying the cathode end of condenser 12 to a large negative voltage.

Finally, the use of a tube in parallel with the cathode condenser 12 during the time of transmission contributes its share to the reduction of the dead time.

The large peak power output from this circuit is contributed to in several ways. Firstly, plate modulation is used with the pulse transformer 10 preferably having a relatively high step-up ratio. In one instance this ratio was 5:1. Secondly, simultaneous cathode pulsing of tube 10 while transmitting lowers the effective bias and allows more current to flow through the tube, thus increasing the output power. Thirdly, the cathode follower connected to the grid circuit of the oscillator allows the grid current to flow through it while transmitting and, consequently, also reduces the bias.

While there has been described what is at present considered the preferred embodiment of the invention, it will be obvious to those skilled in the art that various changes and modifications may be made therein without departing from the invention.

What is claimed is:

1. A combination receiver transmitter circuit for receiving and transmitting pulse signals comprising a superregenerative receiver embodying a cavity resonator, a disc seal electron tube mounted in said cavity as the superregenerative detector of said receiver, a resistance-capacitance network in the cathode circuit of said tube, a second electron tube in parallel with said resistance-capacitance network, a quench oscillator circuit, and cathode follower means, the output of said quench oscillator being coupled to the grid circuit of said disc seal tube through said cathode follower means; and transmitter means comprising video amplifier means, pulse transformer means coupling the output of said disc seal tube to said video amplifier, normally non-conducting blocking oscillator means, means coupling the output of said video amplifier to said blocking oscillator, modulator means coupled to the output of said blocking oscillator, means for coupling the output of said blocking oscillator to the grid of said second electron tube, and said pulse transformer coupling the output of said modulator means to said disc seal tube, said disc seal tube being the oscillator of said transmitter, whereby each pulse signal received by said superregenerative receiver causes said blocking oscillator to produce an enabling pulse, said enabling pulse being delivered through said modulator means to said disc seal tube, for causing said disc seal tube to oscillate during the enabling pulse period, and said enabling pulse being also impressed on said second electron tube for causing said second electron tube to shunt said resistance capacitance network during said enabling pulse period.

2. In combination, a superregenerative receiver for reception of electromagnetic pulses comprising a disc seal tube-cavity resonator oscillator circuit, a quench oscillator, and a cathode follower, the quench voltage from said quench oscillator being coupled to said disc seal tube through said cathode follower, a radio pulse transmitter comprising said disc seal tube oscillator circuit, a blocking oscillator, means for coupling the output of said disc seal tube oscillator to said blocking oscillator, whereby a video pulse is formed when a pulse is received by said disc seal tube, modulator means connected to the output of said blocking oscillator for increasing the power of said video pulse, and means for applying said video pulse from said modulator to the plate circuit of said disc seal tube oscillator, whereby relatively high power oscillations are generated for a short time thereby.

3. A transponder comprising superregenerative receiver means for receiving pulse signals, said means including an electron tube superregenerative detector, a pulse generator having an input time constant circuit, cathode follower means, said input time constant circuit of said pulse generator being connected to the output of said receiver means through said cathode follower means for generating an enabling pulse of predetermined configuration in response to a pulse signal output of said receiver means, transmitter means including said electron tube as the output oscillator thereof, and means for applying the output of said pulse generator to said transmitter for energizing said transmitter for the duration of said enabling pulse.

4. A transponder according to claim 3, wherein said superregenerative receiver means comprises quench oscillator means, second cathode follower means connected to the output of said quench oscillator means, and said superregenerative detector being connected to the output of said second cathode follower.

5. A transponder according to claim 3, wherein said pulse generator comprises a normally inoperative blocking oscillator, said blocking oscillator being energized by a pulse signal output of said receiver means.

6. A transponder according to claim 3, wherein said superregenerative detector tube includes a cathode bias circuit therefor and a normally open switch in shunt with said circuit, and wherein said last-named means comprises a means for applying said enabling pulse to the anode circuit of said electron tube, and means for simultaneously closing said switch in the cathode circuit of said electron tube in response to said enabling pulse thereby shunting said cathode bias circuit for the duration of said enabling pulse.

7. A transponder comprising means for receiving pulse signals, said means including an electron tube superregenerative detector having a resistor-condenser cathode bias circuit, blocking oscillator means for generating an enabling pulse when energized by a pulse signal output of said receiving means, transmitter means including said tube as the output oscillator thereof, means applying the enabling pulse output of said blocking oscillator means to said transmitter for energizing said transmitter during the enabling pulse period, and means for reducing the recovery time of said transponder after a pulse has been transmitted therefrom comprising a normally non-conductive second electron tube in shunt with said resistor-condenser bias circuit, and means responsive to said enabling pulse for rendering said last mentioned electron tube conductive.

8. A transponder according to claim 7, wherein said means for reducing the recovery time of said transponder further includes a cathode follower connected to the input circuit of said blocking oscillator providing a low resistance grid discharge path for said blocking oscillator.

9. A transponder according to claim 7, wherein said means for reducing the recovery time of said transponder further includes a source of negative potential connected to the cathode of said electron tube for facilitating the discharge of said condenser in said cathode bias circuit.

10. A combination according to claim 2, wherein said means for coupling the output of said disc seal tube oscillator to said blocking oscillator comprises a cathode follower providing a low resistance discharge path for said blocking oscillator.

DONALD R. YOUNG.

REFERENCES CITED

The following references are of record in the file of this patent:

UNITED STATES PATENTS

| Number | Name | Date |
| --- | --- | --- |
| 2,044,061 | Crawford | June 16, 1936 |
| 2,320,428 | Hansell | June 1, 1943 |
| 2,415,667 | Wheeler | Feb. 11, 1947 |